US008787007B2

(12) United States Patent
Stokman

(10) Patent No.: US 8,787,007 B2
(45) Date of Patent: Jul. 22, 2014

(54) SYSTEM FOR MOUNTING APPLIANCES BEHIND A FLAT PANEL DISPLAY

(75) Inventor: Herbert Stokman, Haarlem (NL)

(73) Assignee: AVCI, Haarlem (NL)

(*) Notice: Subject to any disclaimer, the term of this patent is extended or adjusted under 35 U.S.C. 154(b) by 185 days.

(21) Appl. No.: 13/406,977

(22) Filed: Feb. 28, 2012

(65) Prior Publication Data

US 2013/0222996 A1    Aug. 29, 2013

(51) Int. Cl.
*G06F 1/16* (2006.01)

(52) U.S. Cl.
USPC ....... 361/679.21; 349/155; 345/204; 248/489

(58) Field of Classification Search
USPC ........... 349/58, 65, 40, 43, 143, 155, 157, 62, 349/187, 189; 361/679.22, 679.47, 679.33, 361/679.02, 679.31, 679.21, 679.27, 361/679.08, 679.54, 679.01, 679.28, 361/679.23, 679.15, 679.34, 679.55, 361/679.26, 679.52; 345/690, 102, 76, 1.1, 345/204, 420, 207, 156, 173, 419, 212; 455/550.1, 558, 347, 419, 51, 556; 248/490, 476, 489, 201, 220.41, 460, 248/125.1, 176.1
See application file for complete search history.

(56) References Cited

U.S. PATENT DOCUMENTS 6,490,154 B2 *  12/2002  Thompson ............... 361/679.41
8,266,640 B2 *   9/2012  Kang et al. .................... 720/601

| 2006/0091280 | A1 |   | 5/2006  | Rothschild |
| 2008/0186669 | A1 |   | 8/2008  | Chang |
| 2009/0251880 | A1 |   | 10/2009 | Anderson |
| 2009/0294599 | A1 |   | 12/2009 | Chen et al. |
| 2011/0199310 | A1 | * | 8/2011  | Oakley ................ 345/168 |
| 2011/0252628 | A1 | * | 10/2011 | Chen et al. ........... 29/592.1 |
| 2012/0133849 | A1 | * | 5/2012  | Chen .................... 348/843 |

FOREIGN PATENT DOCUMENTS

| EP | 2 424 235   | 2/2012 |
| GB | 2467735     | 8/2010 |
| JP | 2007-102746 | 4/2007 |

OTHER PUBLICATIONS

European Search Report dated Jul. 4, 2012.
Dutch Search Report dated Nov. 23, 2012.

* cited by examiner

*Primary Examiner* — Hung Duong
(74) *Attorney, Agent, or Firm* — Nixon & Vanderhye P.C.

(57) ABSTRACT

The invention relates to a system for mounting an appliance behind a flat panel display having VESA-FDMI holes, comprising: —a mount board (40) provided with a first connection element with which the mount board is connectable to the display via the VESA-FDMI holes; —a support element connectable to the mount board and comprising a support portion having open ends for supporting the appliance thereon; and —an adjustable fastening element connectable to the mount board for fastening the appliance against the mount board, wherein the mount board (40) is connectable to a further mount board of the same type (40').

30 Claims, 12 Drawing Sheets

SYSTEM FOR MOUNTING APPLIANCES BEHIND A FLAT PANEL DISPLAY

TECHNICAL FIELD

The present invention relates to a system for mounting appliances behind a flat panel display such as a computer screen or television.

BACKGROUND ART

Flat panel displays are common for entertainment or computer applications and, as a consequence, an internationally recognized standard has been implemented to provide guidelines for attaching the flat panel displays to a wall. It is also known to mount appliances behind these flat panel displays. The VESA-FDMI (Video Electronics Standards Association-Flat panel display Mounting Interface) Standard lists a range of square/rectangular screw hole patterns. Rectangular screw hole patterns have a larger distance in the direction parallel to the top and bottom side of the display (hereinafter referred as the horizontal direction) than the direction perpendicular to the horizontal direction (hereinafter referred as the vertical direction).

Several mounting devices are known for accommodating appliances used together with the display, such as set-top boxes (digital players) and computers.

WO2009/056814A1 discloses a housing for mounting behind a flat panel display with a retractable and/or extendable means to extend to be accessible by a user when the flat panel display is mounted. The housing is intended to enclose one or more electronic devices. The retractable and/or extendable means is a tray that extends for use and retracts for storage into the device.

JP2007-293913 discloses an LCD display and a simplified computer mounted on the back of the display with a mounting element having a side to be screwed via VESA standard holes, an opposite side for holding the simplified computer and a bottom side for supporting the simplified computer.

JP2004-258934 discloses a tray positioned on top of a flat panel display monitor provided with a VESA mount, the tray being attached to the VESA mount and being supported by a support element the length of which is adjustable.

GB2467735 discloses a storage system for mounting on the rear of a flat panel display comprising fixing brackets attached to the display and main frame hung from the fixing brackets. Housings for various consoles are mounted on the main frame.

Known mounting devices suffer from the drawbacks that they are complex and/or accommodate only specific appliances.

DISCLOSURE OF THE INVENTION

An object of the present invention is to provide a simple system for mounting an appliance behind a flat panel display, which does not suffer from the above and/or other drawbacks.

The present invention is described herein referring to embodiments in which the mount board is intended to be used without being connected to a further mount board and embodiments in which the mount board is connectable to a further mount board.

[Embodiments in which the Mount Board is Intended to be Used without being Connected to a Further Mount Board]

According to the present invention, a system is provided for mounting an appliance behind a flat panel display having VESA-FDMI holes, comprising:

- a mount board provided with a first connection element with which the mount board is connectable to the display via the VESA-FDMI holes, a second connection element and a third connection element;
- a support element connectable to the mount board via the second connection element of the mount board and comprising a support portion having open ends for supporting the appliance thereon; and
- an adjustable fastening element connectable to the board via the third connection element of the mount board for fastening the appliance against the mount board.

The present invention utilizes the VESA-FDMI holes for the attachment of a mount board to the back of a flat panel display. The system according to the present invention provides a simple solution for storing appliances often used together with a display, such as DVD players, computers, game consoles, set top box decoders etc.

An advantage of the present invention is that a wide range of appliances may be mounted on the back of a flat panel display. The fact that the appliance rests on an open ended support allows various types of appliances to be stored behind the display irrespective of the dimensions, especially thickness, of the appliances. The mounted appliance is held by the adjustable fastening element preventing the appliance resting on the support portion of the support element to slide or slip off therefrom.

The first connection element of the mount board may comprise at least one slot having a horizontally elongated shape with its length equal to the distance between two horizontally neighboring VESA-FDMI holes. The mount board can be mounted to the flat panel display by screws or other suitable fastening means through the slot to two VESA-FDMI holes. Preferably, the first connection element of the mount board comprises at least one slot having a horizontally elongated shape with its length larger than the distance between two horizontally neighboring VESA-FDMI holes. The shape and the size of the slot in such embodiments allow adjustment of the horizontal position of the mount board with respect to the flat panel display. For example, this embodiment includes a system for a flat panel display having a 75 mm×75 mm hole pattern, which has at least one horizontally elongated slot having a length more than 75 mm. Similarly, this embodiment includes a system for a flat panel display having a 400 mm×400 mm hole pattern, which has at least one horizontally elongated slot having a length more than 400 mm. In the same way, the system according to this invention covers each of the systems for flat panel displays with all possible VESA-FDMI hole patterns, wherein the system comprises a mount board having a horizontally elongated slot with a suitable length.

In the case of the system for a flat panel display with a distance between horizontally neighboring VESA-FDMI holes of 200 mm or less, the length of the slot is preferably at least 2 cm larger than the distance between the horizontally neighboring VESA-FDMI holes. More preferably, the length of the slot is at least 5 cm or at least 10 cm larger than the distance between the horizontally neighboring VESA-FDMI holes. In the case of the system for a flat panel display with a distance between horizontally neighboring VESA-FDMI holes of more than 200 mm, the length of the slot is preferably at least 5 cm, more preferably at least 10 cm, 20 cm or 40 cm larger than the distance between the two horizontally neighboring VESA-FDMI holes.

The first connection element of the mount board may also comprise at least one slot having a vertically elongated shape with its length equal to the distance between two vertically neighboring VESA-FDMI holes. Preferably, the first connection element of the mount board comprises at least one slot having a vertically elongated shape with its length larger than the distance between two vertically neighboring VESA-FDMI holes. This allows adjustment of the vertical position of the mount board with respect to the display having a suitable VESA-FDMI holes dimension. In the same way as the previously described embodiment, the system according to this invention covers each of the systems for flat panel displays with all possible VESA-FDMI hole patterns, wherein the system comprises a mount board having a vertically elongated slot with a suitable length. In the case of the system for a flat panel display with a distance between vertically neighboring VESA-FDMI holes of 200 mm or less, the length of the slot is preferably at least 2 cm larger than the distance between the vertically neighboring VESA-FDMI holes. More preferably, the length of the slot is at least 5 cm or at least 10 cm larger than the distance between the vertically neighboring VESA-FDMI holes. In the case of the system for a flat panel display with a distance between horizontally neighboring VESA-FDMI holes of more than 200 mm, the length of the slot is preferably at least 5 cm, more preferably at least 10 cm, 20 cm or 40 cm larger than the distance between the two vertically neighboring VESA-FDMI holes.

Preferably, the first connection element of the mount board comprises at least two vertically neighboring slots each having a horizontally elongated shape with its length larger than the distance between two horizontally neighboring VESA-FDMI holes. This is extremely advantageous in that the position of the mount board with respect to the display may be vertically shifted by choosing which slot to be used for fixing the mount board to the display. It is possible to connect the upper slot to the upper VESA-FDMI holes or to the lower VESA-FDMI holes. Alternatively, the lower slot may be connected to the upper VESA-FDMI holes or to the lower VESA-FDMI holes. This allows positioning the mount board on the back of the display where the mount board does not cover relevant functions of the flat panel display, such as connectors for related appliances. Preferably, the distance between the vertically neighboring slots matches the distance between two vertically neighboring VESA-FDMI holes. In this case, it is possible to connect the upper slot to the upper VESA-FDMI holes and the lower slot to the lower VESA-FDMI holes. Use of the two slots of the mount board fixes the mount board more securely to the flat panel display. It is also possible that the first connection element of the mount board comprises at least two horizontally neighboring slots each having a vertically elongated shape with its length larger than the distance between two vertically neighboring VESA-FDMI holes. Preferably, the distance between the horizontally neighboring slots matching the distance between two horizontally neighboring VESA-FDMI holes.

Preferably, the first connection element of the mount board comprises at least three vertically neighboring slots each having a horizontally elongated shape with its length larger than the distance between two horizontally neighboring VESA-FDMI holes. Preferably, each of the distances between the vertically neighboring slots matches the distance between two vertically neighboring VESA-FDMI holes. This is extremely advantageous in that the position of the mount board with respect to the display may be vertically shifted considerably by choosing which two slots to be used for fixing the mount board to the display, while securely fixing the mount board to the display by the use of two slots. It is also possible that the first connection element of the mount board comprises at least three horizontally neighboring slots each having a vertically elongated shape with its length larger than the distance between two vertically neighboring VESA-FDMI holes. Preferably, each of the distances between the horizontally neighboring slots matches the distance between two horizontally neighboring VESA-FDMI holes. In this case, the mount board may be horizontally shifted considerably with respect to the display.

In one embodiment, the first connection element comprises a plurality of, preferably at least 4, holes arranged in a pattern matching the VESA-FDMI holes pattern. More preferably, the first connection element comprises at least 8 holes arranged in a pattern matching two VESA-FDMI holes patterns. Even more preferably, the first connection element comprises at least 12 holes arranged in a pattern matching three VESA-FDMI holes patterns.

Preferably, the mount board comprises an indented area around the first connection element of the mount board, the indented area being indented towards the display when attached. This can prevent the head of the screws or other fastening means inserted in the VESA-FDMI holes to protrude from the surface of the mount board. This is advantageous in that the risk of the appliance being damaged by protruding screw heads is reduced.

Preferably, the second connection element of the mount board comprises a slot into which the support element is insertable. As long as the support element can be partly inserted therein and can be fixed in a position in which the support portion extends substantially perpendicular to the mount board to support appliance, the slot may have any shape. For example, the slot may be circular and the support element may be a board provided with a screw extending in the same plane as the board at one end thereof. In this case, this screw may be inserted in the slot and fastened by suitable means, whereby the support element is fixed to the mount board and the support portion extends substantially perpendicular to the mount board.

Preferably, the second connection element comprises a slot and the support element comprises a portion insertable into the slot of the second connection element to be retained between the display and the mount board when the mount board is mounted to the display. In this embodiment, the support portion extends in a substantially perpendicular direction to the portion insertable into the slot of the second connection element. When the insertable portion is inserted through the slot, the insertable portion is held between the display and the mount board and retained there. Preferably, more than one support element is used. A plurality of support elements may be inserted in one slot. The mount board may also be provided with more than one slot.

Preferably, the support element further comprises a joint portion between the support portion and the insertable portion, the joint portion comprising a first joint portion extending substantially perpendicular from the support portion and a second joint portion extending substantially perpendicular from the insertable portion. This is advantageous in that the joint portion allows the support element to rest on the slot of the second connection element even when there is no appliance on the support portion.

Preferably, the support element further comprises a protrusion between the support portion and the first joint portion, protruding in the direction away from the second joint portion. The protrusion further improves the stability of the attachment of the support element to the mount board.

Preferably, the mount board further comprises a support assisting member provided below the second connection element, having a supporting face for supporting the support element. The support assisting member assists the supporting element in supporting appliances by allowing the support portion of the supporting element to rest thereon. The support assisting member may be formed at the bottom of the mount board from the bottom part of the mount board bent perpendicular to the face of the mount board.

Preferably, the supporting face is provided with a slot extending parallel to the slot of the second connection element, into which slot the protrusion of the support element is insertable. This arrangement further improves the stability of the attachment of the support element to the mount board and the function of the support element.

Preferably, the third connection element comprises a first slot and a second slot and the fastening element comprises a band comprising ends which are connectable to the first slot and the second slot. The ends may be constructed in various ways so that they may be connected to the slots. The length of the band may be adjustable to fit the size, especially thickness of the appliance when the ends are connected to the third connection element.

Alternatively, the fastening element comprises a first band connectable to the first slot and a second band connectable to the second slot, and the first band and the second band have open ends which are connectable to each other. The open ends may be provided with hook-and-loop fasteners (e.g. Velcro®, a button and several holes, a buckle and the like. After an appliance is placed on the support portion, the first band and the second band are connected to each other to hold the appliance in place and prevents it from falling over in the direction away from the mount board.

The first and the second slots of the third connection element are preferably arranged in horizontally substantially same positions. The adjustable fastening element may also be in a form of a loop and be elastic. The loop is attached to the mount board by passing through said two slots of the third connection element of the mount board. In this case, an appliance may be inserted in the loop until it reaches the support portion, and the elastic loop holds the appliance in position. The adjustable fastening element may also be an elastic band whose both ends are attached to the mount board. Also in this case, an appliance may be inserted in the loop until it reaches the support portion. The mount board may also have more than one pair of slots and more than one corresponding adjustable fastening element.

The mount board may further comprise an opening. This is advantageous in that a light mount board is achieved and the opening provides possibility for preventing relevant functions of the flat panel display to be covered, such as connection holes to related appliance. Preferably, the opening is at least 4 cm$^2$, more preferably at least 10 cm$^2$.

The mount board is preferably smaller than the flat panel display on which it is mounted.

The mount board may either be rigid or flexible. The mount board may also be partly rigid and partly flexible. Preferably, the mount board is rigid in view of obtaining a higher strength.

Preferably, the system further comprises an infrared receiver which is connectable to the appliance to be mounted on the mount board for operating the appliance. The infrared receiver receives signals from e.g. a remote controller for operating the appliance and transfers it to the appliance mounted on the mount board. The infrared receiver is connected to the appliance is preferably placed in a location reachable by the infrared.

According to a further aspect of the invention, a mount board as described above is provided.

Preferably, the mount board is made from one piece of a plate-shaped material. This is advantageous in easy manufacturing and strength of the mount board. Accordingly, a process for making the mount board according to the present invention is provided, wherein the mount board is made by bending one piece of a plate-shaped material. It will be appreciated that the plate-shaped material may be of metal or polymer or the like. Metals such as steel and aluminum are preferred for their strength. It will also be appreciated that the mount board may be square, rectangular or any other polygonal shape, or circular, oval or any other suitable shape.

According to a further aspect of the invention, a support element as described above is provided.

Preferably, each of the support element is made from one piece of a plate-shaped material. This is advantageous in easy manufacturing and strength of the support element. Accordingly, a process for making the support element according to the present invention is provided, wherein the support element is made from one plate.

It is noted that the invention relates to all possible combination of features recited in the claims. It is specifically mentioned that especially the combinations of the features relating to the first connection element, the features relating to the support element and the second connection element, and the features relating to the fastening element and the third connection element are part of the invention.

[Embodiments in which the Mount Board is Connectable to a Further Mount Board]

According to the present invention, a system is provided for mounting an appliance behind a flat panel display having VESA-FDMI holes, comprising:

a mount board provided with a first connection element with which the mount board is connectable to the display via the VESA-FDMI holes;

a support element connectable to the mount board and comprising a support portion having open ends for supporting the appliance thereon; and an adjustable fastening element connectable to the mount board for fastening the appliance against the mount board, wherein the mount board is connectable to a further mount board of the same type.

The present invention utilizes the VESA-FDMI holes for the attachment of a mount board to the back of a flat panel display. The system according to the present invention provides a simple solution for storing appliances often used together with a display, such as DVD players, computers, game consoles, set top box decoders etc.

An advantage of the present invention is that a wide range of appliances may be mounted on the back of a flat panel display. The fact that the appliance rests on an open ended support allows various types of appliances to be stored behind the display irrespective of the dimensions, especially thickness, of the appliances. The mounted appliance is held by the adjustable fastening element preventing the appliance resting on the support portion of the support element to slide or slip off therefrom.

The size of the system of the present invention to be mounted behind the flat panel display can be advantageously adjusted by connecting together a desired number of the mount boards. This allows that the system may be used for various types of displays and appliances.

The mount boards may be connectable at their sides (side by side) and/or at the top and bottom (top to tail). Preferably, the mount boards are connectable at least side by side.

As used herein, the mount board of the same type is understood to mean the mount board according to the present invention.

Preferably, the system comprises at least two of the mount boards according to the present invention.

Preferably, the mount board has one side provided with a display facing groove for facing the display during use and an appliance facing groove facing the opposite way and the display facing groove and the appliance facing groove have corresponding shapes which allow sliding into each other. In this embodiment, the display facing groove of one mount board slides into the appliance facing groove of the mount board next to it and the connection is made between the two mount boards.

As used herein, during use is meant during the time that the mount board is connected behind the flat panel display.

Preferably, the display facing groove and/or the appliance facing groove are provided with a locking means for fixing to each other. An example of the locking means is a finger which clicks into a slot in the corresponding groove.

Preferably, the mount board is provided with a horizontally extending groove having at least one open end and the support element is insertable into the horizontally extending groove through the open end to be retained therein.

Preferably, the adjustable fastening element comprises at least two positioning elements connectable to the mount board and a band connectable to the at least two positioning elements. The mount board is arranged such that the positioning elements are connectable to the mount board at different positions so that the distance between the two neighboring positioning elements may be varied. The positioning elements are to be connected to the mount board so that the appliance is located between two neighboring positioning elements. The band is connectable to the positioning elements such that the band holds the appliance in place between the positioning elements. During use, the positioning elements are preferably positioned on the mount board so that the two neighboring positioning elements are close to the appliance located between the positioning elements. The band connected to the positioning elements can then firmly hold the appliance.

Preferably, the mount board is provided with a first horizontally extending groove having at least one open end and at least two of the positioning elements are insertable into the first horizontally extending groove through the open end to be retained therein. For mounting the appliance, the positioning elements are inserted in the same groove such that the appliance is positioned between two horizontally neighboring positioning elements. The appliance rests on the support element connected to the mount board at a lower vertical position than the positioning elements. This embodiment has an advantage that the positions of the positioning elements and hence the distance between the positioning elements can be chosen so that the appliance is retained with a suitable strength.

Preferably, the mount board is further provided with a second horizontally extending groove having at least one open end and the positioning elements and/or the support element are insertable into the second horizontally extending groove through the open end to be retained therein, wherein the second horizontally extending groove is positioned at a lower vertical position than the first horizontally extending groove. The second groove preferably has the same shape as the first groove.

The embodiment in which the positioning elements are insertable into the first and the second horizontally extending grooves allows various ways of holding the appliance, for example: two positioning elements are inserted in the first groove; two positioning elements are inserted in the second groove; or one positioning element is inserted in the first groove and one positioning element is inserted in the second groove. When two positioning elements are inserted in the first groove, the appliance is held by the band at a higher vertical position. When two positioning elements are inserted in the second groove, the appliance is held by the band at a lower vertical position. In these cases where the two positioning elements are inserted in the same groove, the distance between the positioning elements can be chosen so that the appliance is retained with a suitable strength. When two positioning elements are inserted in different grooves, the appliance is held by the band extending in a vertical or a diagonal direction. This is advantageous when the appliance requires access from the side. For example, Play Station® or Xbox® has a disc tray which moves out of the game console. Since the disc tray moves horizontally (sideways), it is preferable that the band holds the console by a band running vertically so that the movement of the tray is not blocked by the band.

It is also possible to use more than two positioning elements and more than one band. For example, two positioning elements are inserted in the first groove and two positioning elements are inserted in the second groove and all positioning elements are connected to each other by bands extending horizontally, vertically or diagonally.

Preferably, the mount board is further provided with a third horizontally extending groove having at least one open end and the positioning elements and/or the support element are insertable into the third horizontally extending groove through the open end to be retained therein, wherein the third horizontally extending groove is positioned at a lower vertical position than the second horizontally extending groove. The third groove preferably has the same shape as the first and/or the second groove. A greater flexibility of the positions of the positioning elements is achieved.

The mount board may be provided with further grooves at lower vertical positions than the third groove for accommodating the positioning elements.

Preferably, the support element is insertable into the second, third or further horizontally extending groove through the open end to be retained therein. In this case, no additional means are required for connection of the support element to the mount board.

In a particularly preferred embodiment, the mount board is provided with two three vertically neighboring, horizontally extending grooves each having at least one open end, wherein the positioning elements and/or the support element are insertable into the grooves through the open end to be retained therein.

The positioning elements and/or the support element may be fixed at the desired locations of the horizontally extending groove. The horizontally extending groove and the positioning elements and the support element may be shaped and dimensioned such that the positioning elements and the support element are held in the groove tight enough so that they move only when an appropriate amount of force typically applicable by hands is applied.

The horizontally extending groove may be provided with teeth and the positioning elements and/or the support element may be provided with a protrusion which cooperates with the teeth to fix the elements in defined positions.

Various embodiments are possible for the positioning elements and the band. The band may be elastic or non-elastic.

The positioning element may comprise a portion defining a slot into which the band may be inserted. The band may be inserted into the slots of two positioning elements connected at their respective positions on the mount board. After an appliance is placed on the support portion, the ends of the band are connected to each other to form a loop which runs around the appliance. The loop holds the appliance in place and prevents it from falling over in the direction away from the mount board. The open ends of the band may be provided with hook-and-loop fasteners (e.g. Velcro®, a button and several holes, a buckle and the like.

The size of the loop may be adjustable to fit the size, especially thickness of the appliance. This allows adjustment of the tightness of the fastening element.

The slots of the two positioning elements preferably face each other when two positioning elements are connected to the mount board. For example, a positioning element which has a slot facing in the horizontal direction are preferably placed at the same vertical position as another positioning element having the same shape. Two of these positioning elements can hold the appliance by a band running in the horizontal direction. Accordingly, in a preferred embodiment, the positioning elements comprise slots which face each other when inserted in the same groove. Similarly, a positioning element which has a slot facing in the vertical direction are preferably placed at the same horizontal position as another positioning element having the same shape. Two of these positioning elements can hold the appliance by a band running in the vertical direction. Accordingly, in a preferred embodiment, the positioning elements comprise slots which face each other when inserted in different grooves.

Instead of holding the appliance by the loop formed around the appliance, the appliance may be held between the band and the mount board. The band comprises ends connectable to the positioning elements. The ends may be constructed in various ways so that they may be connected to the slots. The length of the band may be adjustable to fit the size, especially thickness of the appliance. The band may be formed of two pieces, each of the pieces having one end connectable to the positioning element and one end connectable to each other.

The system may comprise one support element or more than one support element. Preferably, the system comprises more than one support element.

The support element may be provided with a hole. A band may be inserted in the hole to form a loop, which loop may be used for organizing cables of the display and/or the appliance mounted on the system.

The appliance facing groove provided at the side of the mount board may intersect with the open ends of the horizontally extending grooves. The open ends of the horizontally extending grooves may be closable by the neighbouring mount board. The closed ends ensure that the positioning elements and the support elements inserted in the grooves do not fall out of the grooves.

In some embodiments of the present invention, the system further comprises a bar slidable into the appliance facing groove to fill the appliance facing groove. The bar may close the open ends of the horizontally extending grooves.

The mount board may be provided with further connection means for the support element and the positioning elements.

The first connection element of the mount board may comprise at least one slot having a horizontally elongated shape with its length equal to the distance between two horizontally neighboring VESA-FDMI holes. The mount board can be mounted to the flat panel display by screws or other suitable fastening means through the slot to two VESA-FDMI holes. Preferably, the first connection element of the mount board comprises at least one slot having a horizontally elongated shape with its length larger than the distance between two horizontally neighboring VESA-FDMI holes. The shape and the size of the slot in such embodiments allow adjustment of the horizontal position of the mount board with respect to the flat panel display. For example, this embodiment includes a system for a flat panel display having a 75 mm×75 mm hole pattern, which has at least one horizontally elongated slot having a length more than 75 mm. Similarly, this embodiment includes a system for a flat panel display having a 400 mm×400 mm hole pattern, which has at least one horizontally elongated slot having a length more than 400 mm. In the same way, the system according to this invention covers each of the systems for flat panel displays with all possible VESA-FDMI hole patterns, wherein the system comprises a mount board having a horizontally elongated slot with a suitable length.

In the case of the system for a flat panel display with a distance between horizontally neighboring VESA-FDMI holes of 200 mm or less, the length of the slot is preferably at least 2 cm larger than the distance between the horizontally neighboring VESA-FDMI holes. More preferably, the length of the slot is at least 5 cm or at least 10 cm larger than the distance between the horizontally neighboring VESA-FDMI holes. In the case of the system for a flat panel display with a distance between horizontally neighboring VESA-FDMI holes of more than 200 mm, the length of the slot is preferably at least 5 cm, more preferably at least 10 cm, 20 cm or 40 cm larger than the distance between the two horizontally neighboring VESA-FDMI holes.

In the cases where the system comprises two mount boards, the mount board may have a slot having a horizontally elongated shape with its length smaller than the distance between two horizontally neighboring VESA-FDMI holes. In this case, one mount board is connectable to the display via one of the two horizontally neighboring VESA-FDMI holes and the neighboring mount board is connectable to the display via the other one of the two horizontally neighboring VESA-FDMI holes.

The first connection element of the mount board may also comprise at least one slot having a vertically elongated shape with its length equal to the distance between two vertically neighboring VESA-FDMI holes. Preferably, the first connection element of the mount board comprises at least one slot having a vertically elongated shape with its length larger than the distance between two vertically neighboring VESA-FDMI holes. This allows adjustment of the vertical position of the mount board with respect to the display having a suitable VESA-FDMI holes dimension. In the same way as the previously described embodiment, the system according to this invention covers each of the systems for flat panel displays with all possible VESA-FDMI hole patterns, wherein the system comprises a mount board having a vertically elongated slot with a suitable length. In the case of the system for a flat panel display with a distance between vertically neighboring VESA-FDMI holes of 200 mm or less, the length of the slot is preferably at least 2 cm larger than the distance between the vertically neighboring VESA-FDMI holes. More preferably, the length of the slot is at least 5 cm or at least 10 cm larger than the distance between the vertically neighboring VESA-FDMI holes. In the case of the system for a flat panel display with a distance between horizontally neighboring VESA-FDMI holes of more than 200 mm, the length of the slot is preferably at least 5 cm, more preferably at least 10 cm, 20 cm or 40 cm larger than the distance between the two vertically neighboring VESA-FDMI holes.

Preferably, the first connection element of the mount board comprises at least two vertically neighboring slots each having a horizontally elongated shape with its length larger than the distance between two horizontally neighboring VESA-FDMI holes. This is extremely advantageous in that the position of the mount board with respect to the display may be vertically shifted by choosing which slot to be used for fixing the mount board to the display. It is possible to connect the upper slot to the upper VESA-FDMI holes or to the lower VESA-FDMI holes. Alternatively, the lower slot may be connected to the upper VESA-FDMI holes or to the lower VESA- FDMI holes. This allows positioning the mount board on the back of the display where the mount board does not cover relevant functions of the flat panel display, such as connectors for related appliances. Preferably, the distance between the vertically neighboring slots matches the distance between two vertically neighboring VESA-FDMI holes. In this case, it is possible to connect the upper slot to the upper VESA-FDMI holes and the lower slot to the lower VESA-FDMI holes. Use of the two slots of the mount board fixes the mount board more securely to the flat panel display. It is also possible that the first connection element of the mount board comprises at least two horizontally neighboring slots each having a vertically elongated shape with its length larger than the distance between two vertically neighboring VESA-FDMI holes. Preferably, the distance between the horizontally neighboring slots matching the distance between two horizontally neighboring VESA-FDMI holes.

Preferably, the first connection element of the mount board comprises at least three vertically neighboring slots each having a horizontally elongated shape with its length larger than the distance between two horizontally neighboring VESA-FDMI holes. Preferably, each of the distances between the vertically neighboring slots matches the distance between two vertically neighboring VESA-FDMI holes. This is extremely advantageous in that the position of the mount board with respect to the display may be vertically shifted considerably by choosing which two slots to be used for fixing the mount board to the display, while securely fixing the mount board to the display by the use of two slots. It is also possible that the first connection element of the mount board comprises at least three horizontally neighboring slots each having a vertically elongated shape with its length larger than the distance between two vertically neighboring VESA-FDMI holes. Preferably, each of the distances between the horizontally neighboring slots matches the distance between two horizontally neighboring VESA-FDMI holes. In this case, the mount board may be horizontally shifted considerably with respect to the display.

In one embodiment, the first connection element comprises a plurality of, preferably at least 4, holes arranged in a pattern matching the VESA-FDMI holes pattern. More preferably, the first connection element comprises at least 8 holes arranged in a pattern matching two VESA-FDMI holes patterns. Even more preferably, the first connection element comprises at least 12 holes arranged in a pattern matching three VESA-FDMI holes patterns.

The mount board may further comprise an opening. This is advantageous in that a light mount board is achieved and the opening provides possibility for preventing relevant functions of the flat panel display to be covered, such as connection holes to related appliance. Preferably, the opening is at least 4 cm$^2$, more preferably at least 10 cm$^2$.

The mount board is preferably smaller than the flat panel display on which it is mounted.

The mount board may either be rigid or flexible. The mount board may also be partly rigid and partly flexible. Preferably, the mount board is rigid in view of obtaining a higher strength.

Preferably, the system further comprises an infrared receiver which is connectable to the appliance to be mounted on the mount board for operating the appliance. The infrared receiver receives signals from e.g. a remote controller for operating the appliance and transfers it to the appliance mounted on the mount board. The infrared receiver is connected to the appliance is preferably placed in a location reachable by the infrared.

According to a further aspect of the invention, a mount board as described above is provided.

In some embodiments, the mount board according to the present invention is made by moulding.

In some embodiments, the mount board according to the present invention is made from one piece of a plate-shaped material. This is advantageous in easy manufacturing and strength of the mount board. Accordingly, a process for making the mount board according to the present invention is provided, wherein the mount board is made by bending one piece of a plate-shaped material. It will be appreciated that the plate-shaped material may be of metal or polymer or the like. Metals such as steel and aluminum are preferred for their strength. It will also be appreciated that the mount board may be square, rectangular or any other polygonal shape, or circular, oval or any other suitable shape.

According to a further aspect of the invention, a support element as described above is provided.

In some embodiments, the support element according to the present invention is made by moulding.

In some embodiments, each of the support element is made from one piece of a plate-shaped material. This is advantageous in easy manufacturing and strength of the support element. Accordingly, a process for making the support element according to the present invention is provided, wherein the support element is made from one plate.

According to a further aspect of the invention, an adjustable fastening element as described above is provided It is noted that the invention relates to all possible combination of features recited in the claims. It is specifically mentioned that especially the combinations of the features relating to the first connection element, the features relating to the support element, and the features relating to the fastening element are part of the invention.

BRIEF DESCRIPTION OF THE DRAWINGS

These and other aspects of the invention will be apparent from and elucidated with reference to the schematic drawings in which FIGS. 1-8 illustrate the embodiments in which the mount board is intended to be used without being connected to a further mount board and FIGS. 9-13 illustrate the embodiments in which the mount board is connectable to a further mount board.

FIG. 1 schematically shows a perspective view of the back of a flat panel display provided with VESA-FDMI holes;

FIG. 2 schematically shows a perspective view of one embodiment of the mount board and the support element according to the present invention attached to the flat panel display of FIG. 1;

FIG. 3 schematically shows an enlarged view of the support element of FIG. 2;

FIG. 4 schematically shows the embodiment of FIG. 2 where an appliance (e.g. set top box) is mounted on the mount board;

FIG. 5 schematically shows the embodiment of FIG. 4 further with one embodiment of the adjustable fastening element according to the present invention;

FIG. 6 schematically shows an enlarged bottom perspective view of the embodiment of FIG. 5;

FIG. 9(*a*) schematically shows an embodiment of the mount board according to the present invention seen from the appliance facing side;

FIG. 10 schematically shows an embodiment of the two mount boards according to the present invention connected together;

FIG. 11 schematically shows a perspective view of one embodiment of the support element according to the present invention;

DETAILED DESCRIPTION OF EMBODIMENTS

It is noted that the same reference numbers have been used for corresponding elements in the embodiments wherever possible.

In the description, terms 'higher' and 'lower' vertical positions (and terms above and below) are used to indicate vertical positions in or of the mount board when the board is attached to the display, where the higher vertical position refers to a position closer to the top of the display than the lower vertical position.

[Embodiments in which the Mount Board is Intended to be Used without being Connected to a Further Mount Board]

Figure 1:
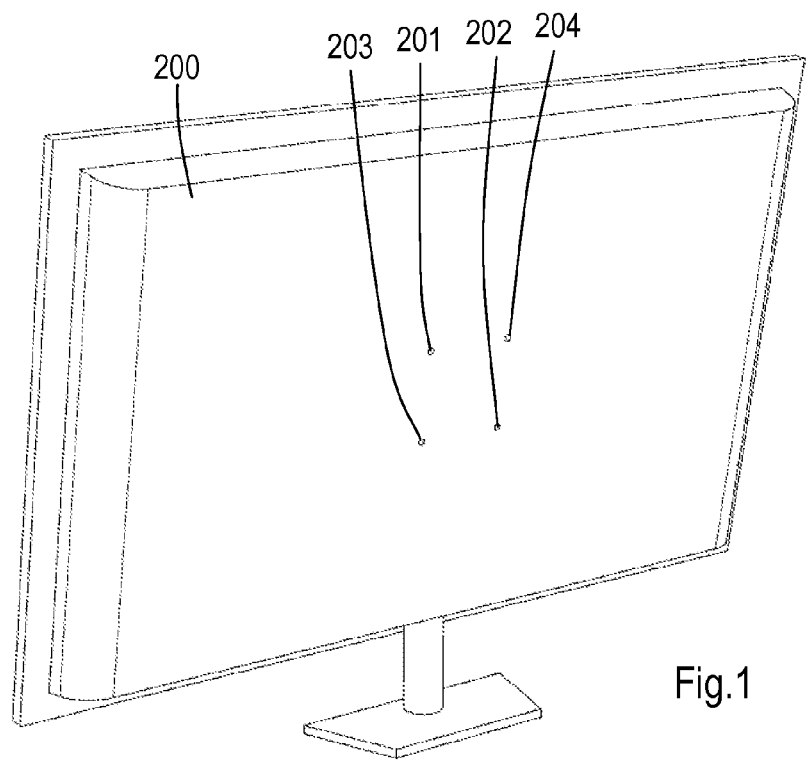

FIG. 1 shows a perspective view of the back of a flat panel display 200 provided with four VESA-FDMI holes 201, 202, 203, 204. A mount board according to the present invention is to be attached to the back of the flat panel via the VESA-FDMI holes 201, 202, 203, 204.

Figure 2:
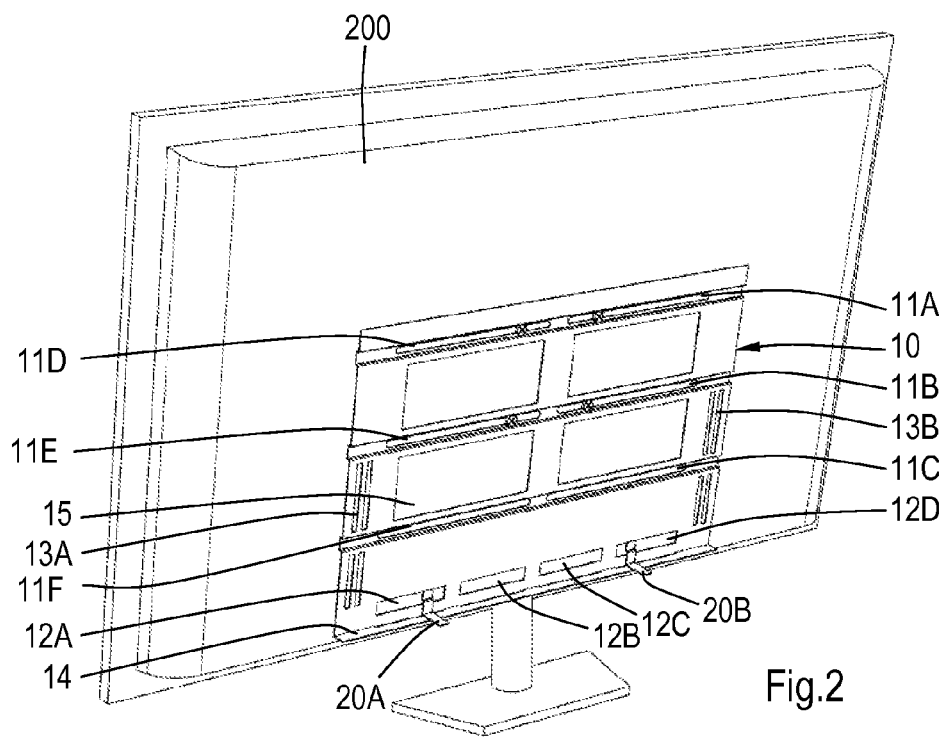

Referring to FIG. 2, a perspective view is shown of a flat panel display 200 and a mount board 10 according to the invention mounted behind it and two support elements 20A and 20B connected to the mount board 10. The mount board 10 comprises a first connection element in the form of slots 11A-11F, a second connection element in the form of slots 12A, 12B, 12C and 12D and a third connection element in the form of slots 13A and 13B, a support assisting member 14 as well as holes 15. The mount board 10 is a plate which is bent and punctured to form the final shape. Each of the support elements 20A and 20B is a plate which is bent to form the final shape.

The mount board 10 has six slots 11A-11F elongated in the horizontal direction of the display. The slots 11A, 11B and 11C are vertically positioned such that the distance between the slot 11A and 11B and 11B and 11C has a distance which matches the VESA-FDMI holes pattern. The slots 11D, 11E and 11F are arranged in a similar manner. In the figure, the mount board 10 is attached to the flat panel display 200 by means of screws penetrating through the slots 11A, 11B, 11D and 11E into the VESA-FDMI holes 201, 202, 203, 204 in the back of the display 200. The mount board comprises an indented area around slots 11A-11F of the first connection elements of the mount board, the indented area being indented towards the display 200 when the mount board 10 is attached to the display 200. If desired, the mount board 10 may be positioned higher by using the connection elements 11B, 11C, 11E and 11F. It is also possible to shift the mount board 10 horizontally to a desired position by fixing the screws to different horizontal locations. The holes 15 may be used to provide a window for any cables or other connectors, so that they are not covered by the mount board 10. Due to the flexibility in the positioning of the mount board 10 provided by these features, the mount board 10 can be mounted to the back of a flat panel display 200 having various types of configurations. Pairs of horizontally neighboring slots (11A and 11D; 11B and 11E; 11C and 11F) may also be made into one slot, as can e.g. be seen in FIG. 7A.

The mount board 10 in this embodiment further has a second connection element in the form of slots 12A, 12B, 12C and 12D elongated in the direction parallel to the first connection element 11A-11F. Second connection elements 12A-12D are positioned side-by-side, i.e. horizontally neighboring. The mount board 10 in this embodiment further comprises a support assisting member 14 in the form of the bottom part of the mount board 10 bent in the direction away from the display.

Figure 3:
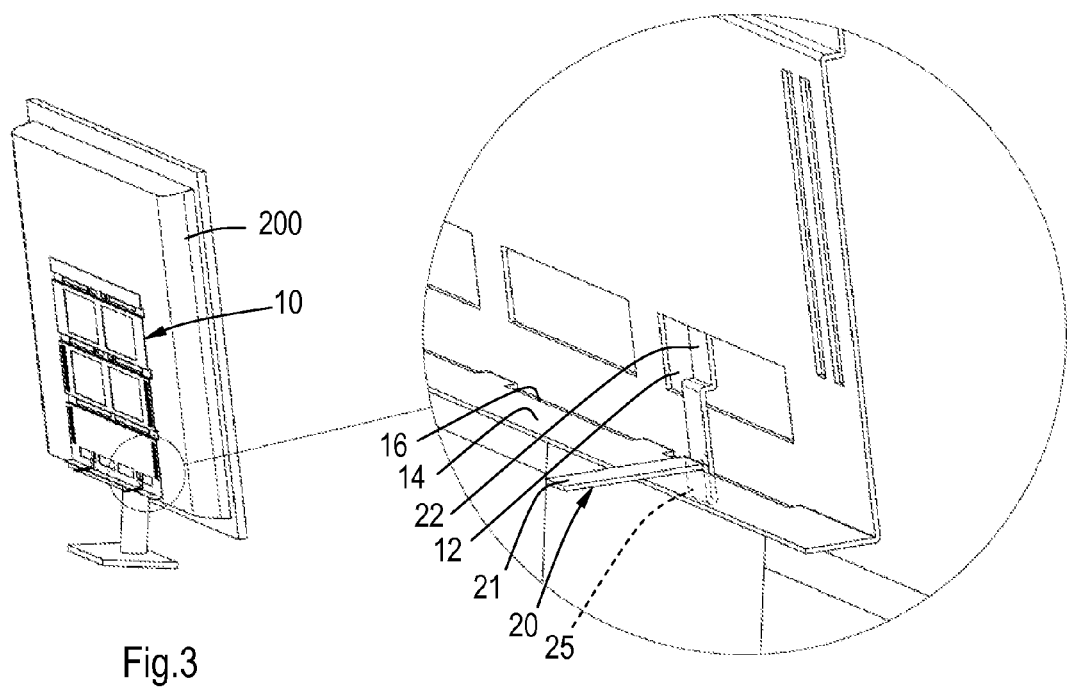

FIG. 3 shows an enlarged view of the area around the support element 20 of FIG. 2. The support assisting member 14 is provided with slots 16 extending parallel to and having the same length as the slots 12 of the second connection elements, respectively. The insertable part 22 of the support element 20 is inserted in the space between the mount board 10 and the display 200, sandwiched by the mount board 10 and the display 200. The protrusion 25 of the support element 20A is fitted in the slot 16 of the support assist member 15. The support part 21 extends substantially vertically from the mount board 10 and the display 200 away from the display 200. An appliance, not shown in the figure, may be placed on the support parts 21 of the support elements 20 to be supported thereby. The shape of the slots 12A-12D and the support element 20 allows adjustment of the horizontal positioning of the support element 20, which allows arranging the support element 20 in a position where it does not block any relevant features of the appliance or the flat panel display.

Figure 4:
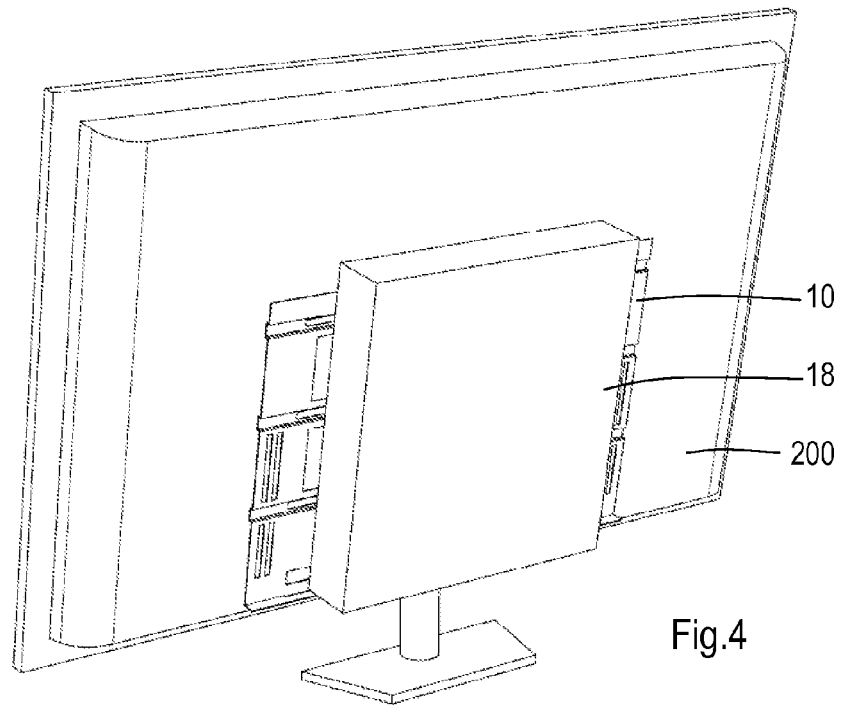

FIG. 4 shows the embodiment of FIG. 2 where an appliance (e.g. a set top box) 18 is mounted on the mount board 10.

Figure 5:
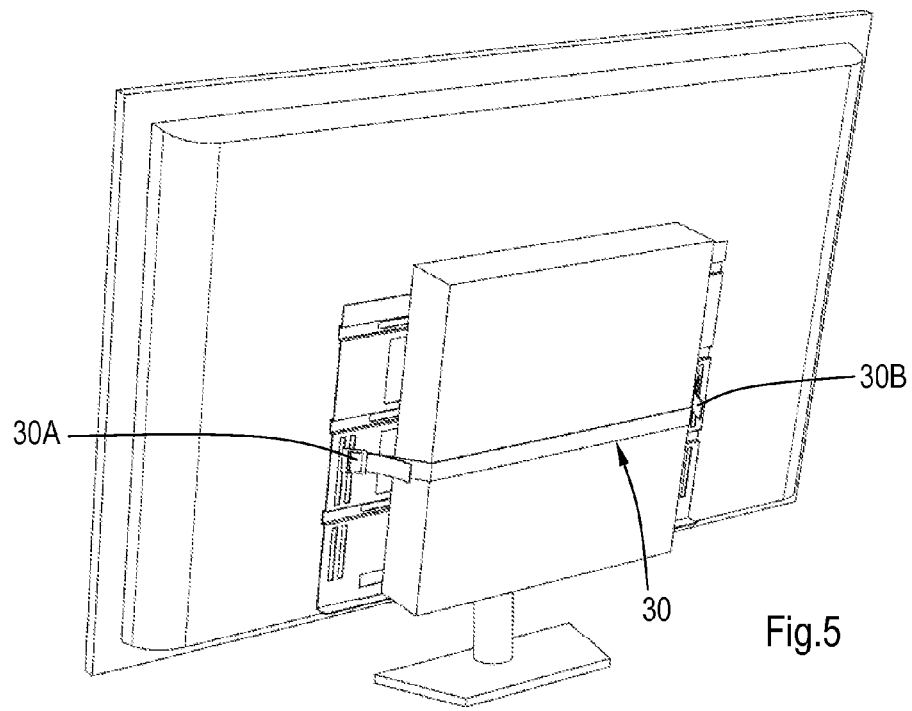

FIG. 5 shows the embodiment of FIG. 4 further with one embodiment of the adjustable fastening element 30 according to the present invention. The mount board 10 in this embodiment further has a third connection element in the form of a pair of horizontally elongated slots and a bar between the slots. The adjustable fastening element 30 is in the form of a band with both ends 30A and 30B provided with connection means. Each of the ends 30A and 30B are connectable to the third connection elements by means of a buckle. When an appliance is placed on the support element 20, the end portions 30A and 30B of the adjustable fastening element 30 are fastened to maintain the appliance 18 in position so that it does not slide or fall from the support element 20A and 20B.

Figure 6:
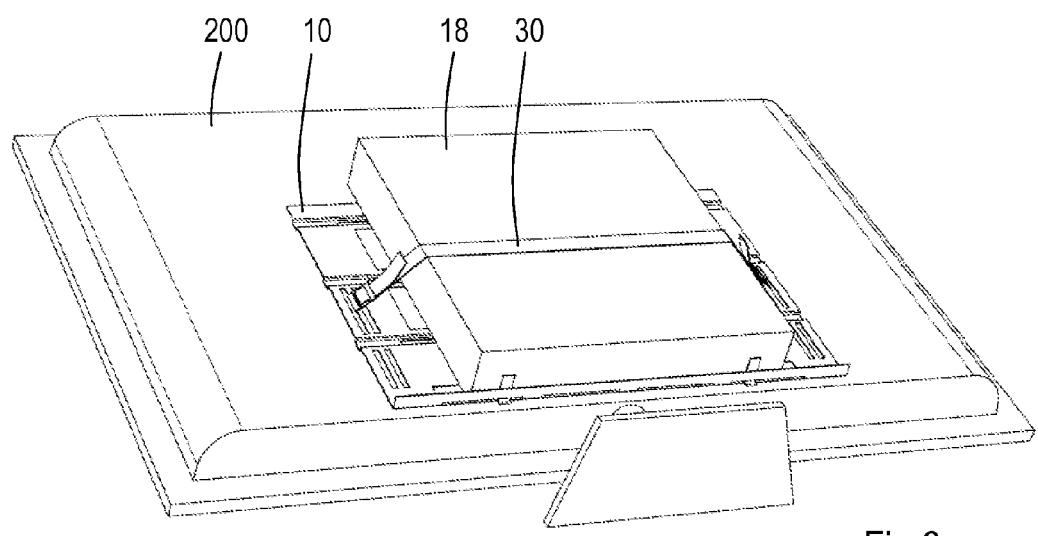

FIG. 6 shows an enlarged bottom perspective view of the embodiment of FIG. 5, showing the three essential components of the system according to the present invention.

Figure 7A:
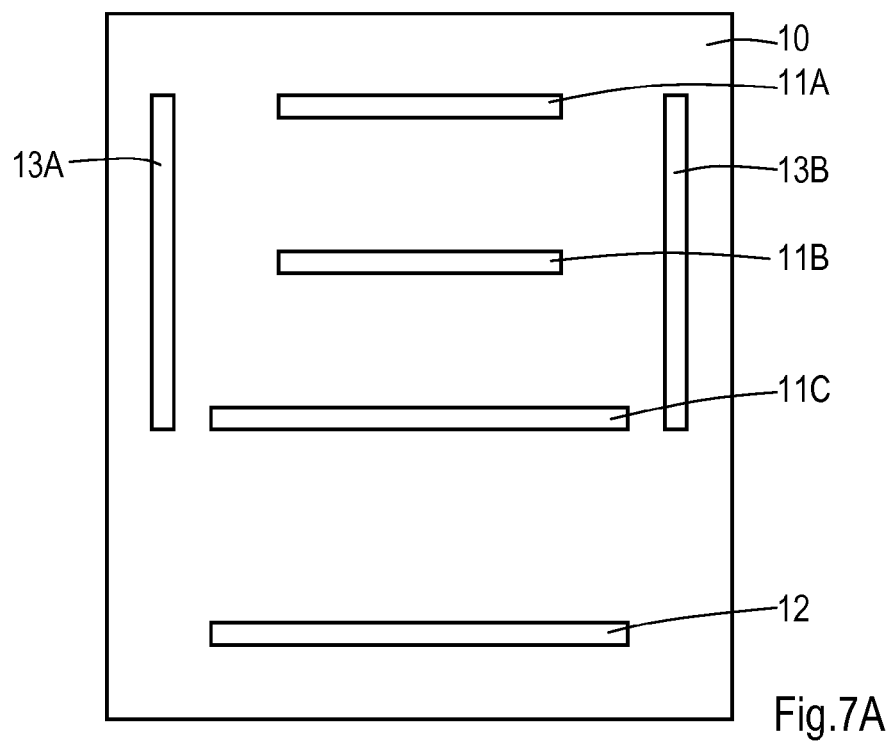
FIG. 7A-7D schematically show various embodiments of the mount board according to the present invention.

FIG. 7A shows a front view of one embodiment of the mount board 10 according to the present invention. The first connection element comprises three horizontally elongated slots 11A, 11B and 11C, vertically distanced to match a VESA-FDMI holes pattern. Below the slot 11C, a second connection element in the form of a long horizontally elongated slot 12 is present. On both sides of the ends of the first connection elements 11A, 11B and 11C, a third connection element in the form of two long horizontally elongated slots 13A and 13B are present.

Figure 7B:
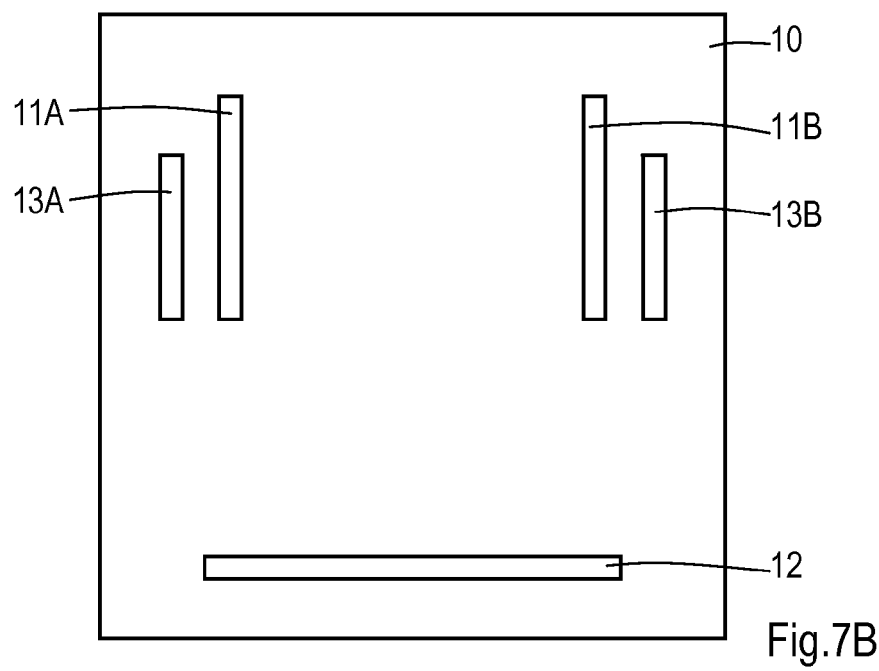

FIG. 7B shows a front view of a further embodiment of the mount board 10 according to the present invention. The first connection element comprises two vertically elongated slots 11A and 11B, horizontally distanced to match a VESA-FDMI holes pattern. Below the slot 11B, a second connection element in the form of a long horizontally elongated slot 12 is present. On both sides of the first connection elements 11A and 11B, a third connection element in the form of two long vertically elongated slots 13A and 13B are present.

Figure 7C:
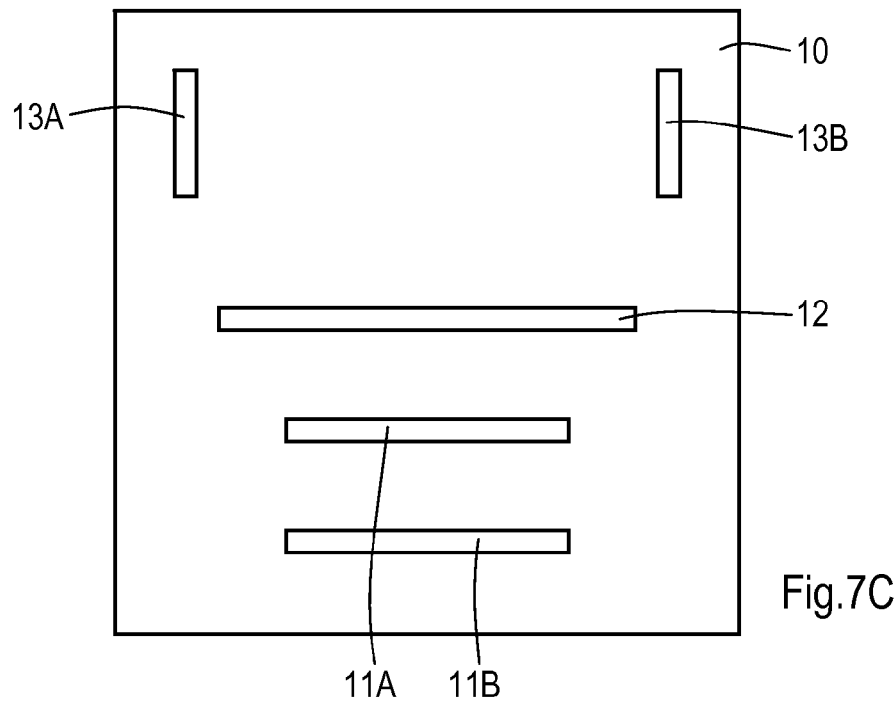

FIG. 7C shows a front view of a further embodiment of the mount board 10 according to the present invention. The first connection element comprises two horizontally elongated slots 11A and 11B, vertically distanced to match a VESA-FDMI holes pattern. Above the slot 11A, a second connection element in the form of a long horizontally elongated slot 12 is present. A third connection element in the form of two horizontally elongated slots 13A and 13B are present in a vertically higher position with respect to the slot 12.

Figure 7D:
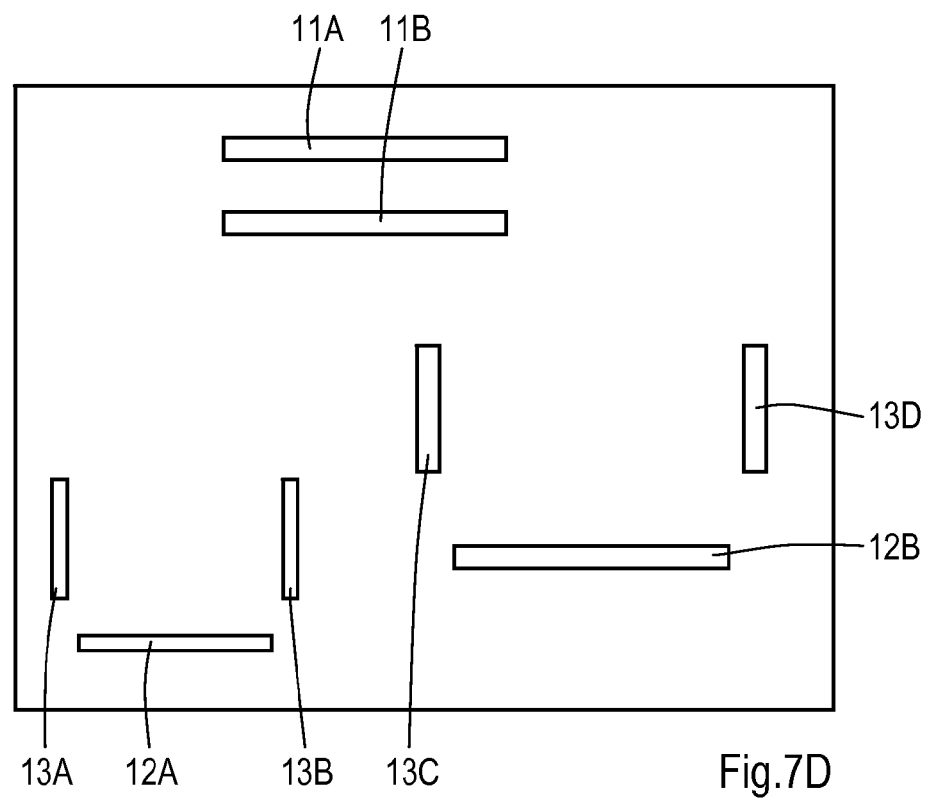

FIG. 7D shows a front view of a further embodiment of the mount board 10 according to the present invention. The first connection element comprises two horizontally elongated slots 11A and 11B, vertically distanced to match a VESA-FDMI holes pattern. Two second connection elements 12A and 12B in the form of a horizontally elongated slot with different lengths are present in a vertically different position. Two horizontally elongated slots 13A and 13B which form part of the third connection element are present in a vertically higher position with respect to the slot 12A. Similarly, two horizontally elongated slots 13C and 13D which form part of the third connection element are present in a vertically higher position with respect to the slot 12B.

Figures 8A, 8B, 8C:
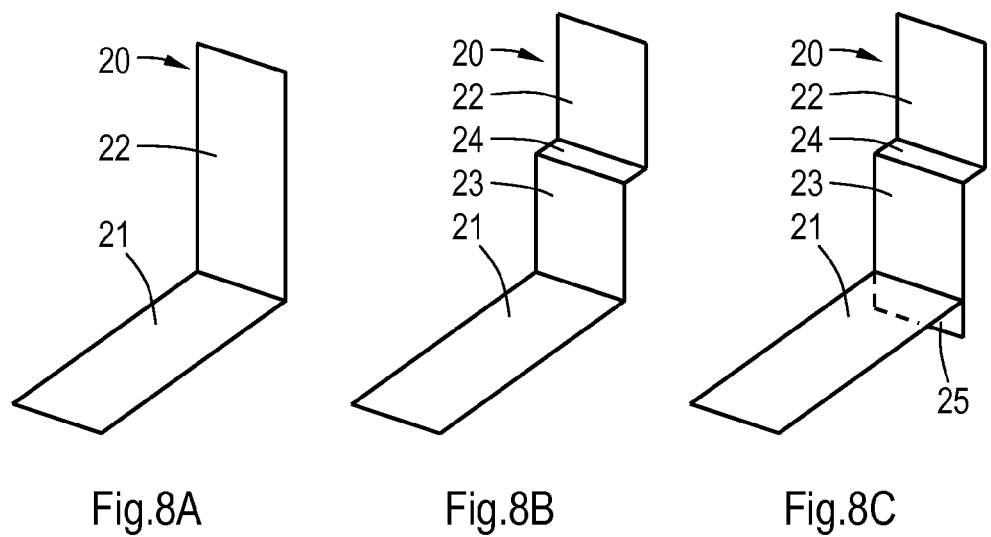
FIG. 8A-8C schematically show various embodiments of the support element according to the present invention.

FIG. 8A shows a perspective view of an embodiment of the support element 20 according to the present invention. The support elements 20 is a thin rectangular plate bent 90 degrees. The support elements 20 comprises a support part 21 having an open end and an insertable part 22 extending from the opposite end of the support part 21 perpendicularly to the support part 21. FIG. 8B shows a perspective view of a further embodiment of the support element 20 according to the present invention. The support elements 20 comprises a support part 21 having an open end and an insertable part 22 extending perpendicularly to the support part 21. Between the support part 21 and the insertable part 22 a first joint part 23 and a second joint part 24 are present. The first joint part 23 extends from the end of the support part 21 opposite from the open end perpendicularly to the support part 21. The second joint part 24 extends from the end of the insertable part 22 opposite from the open end perpendicularly to the insertable part 22.

FIG. 8C shows a perspective view of a further embodiment of the support element 20 according to the present invention. This embodiment is identical to the support element 20 of FIG. 8B except that a protrusion 25 is provided at the joint of the support part 21 and the first joint part 23.

[Embodiments in which the Mount Board is Connectable to a Further Mount Board]

Figure 9A:
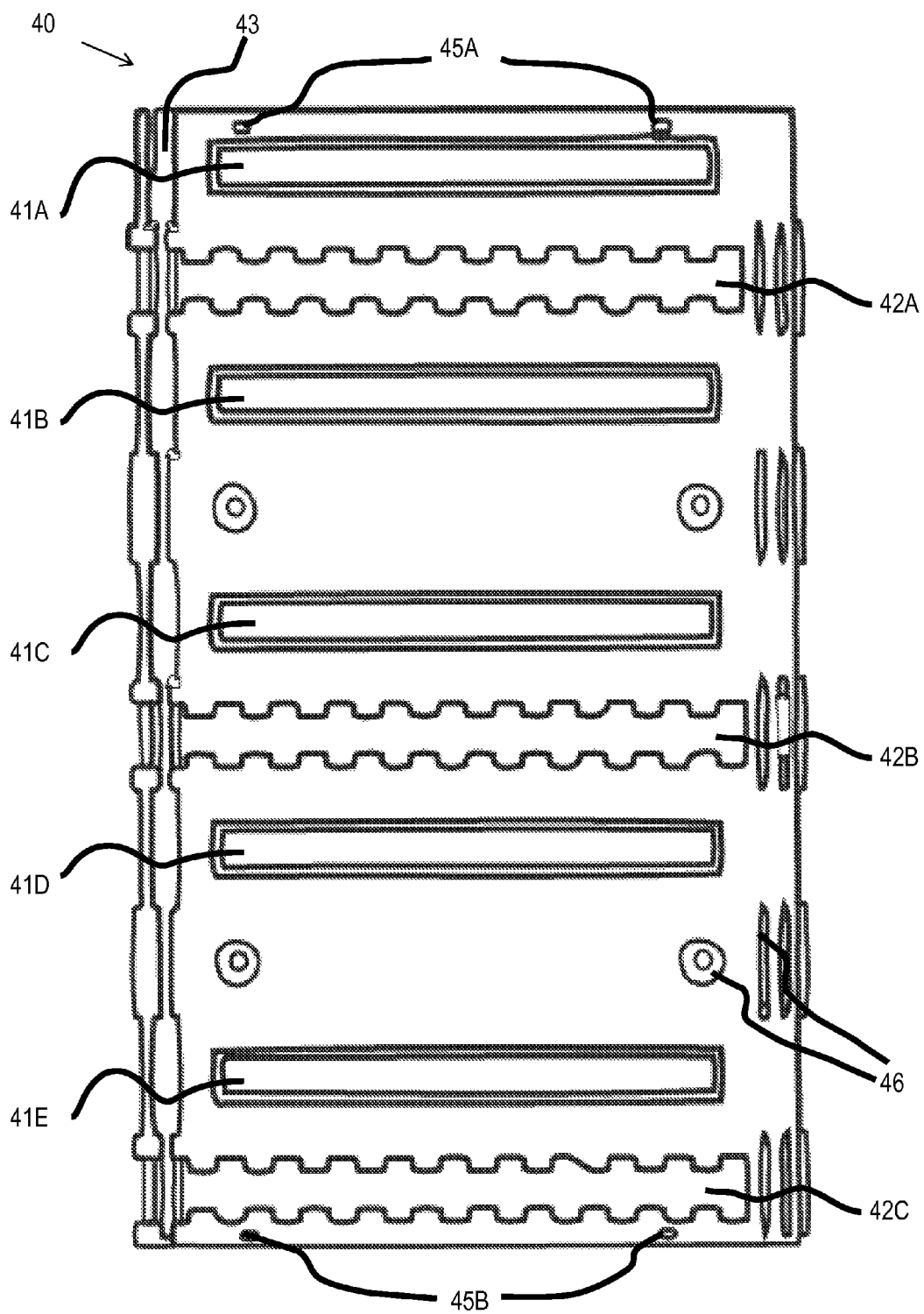
Figure 9B:
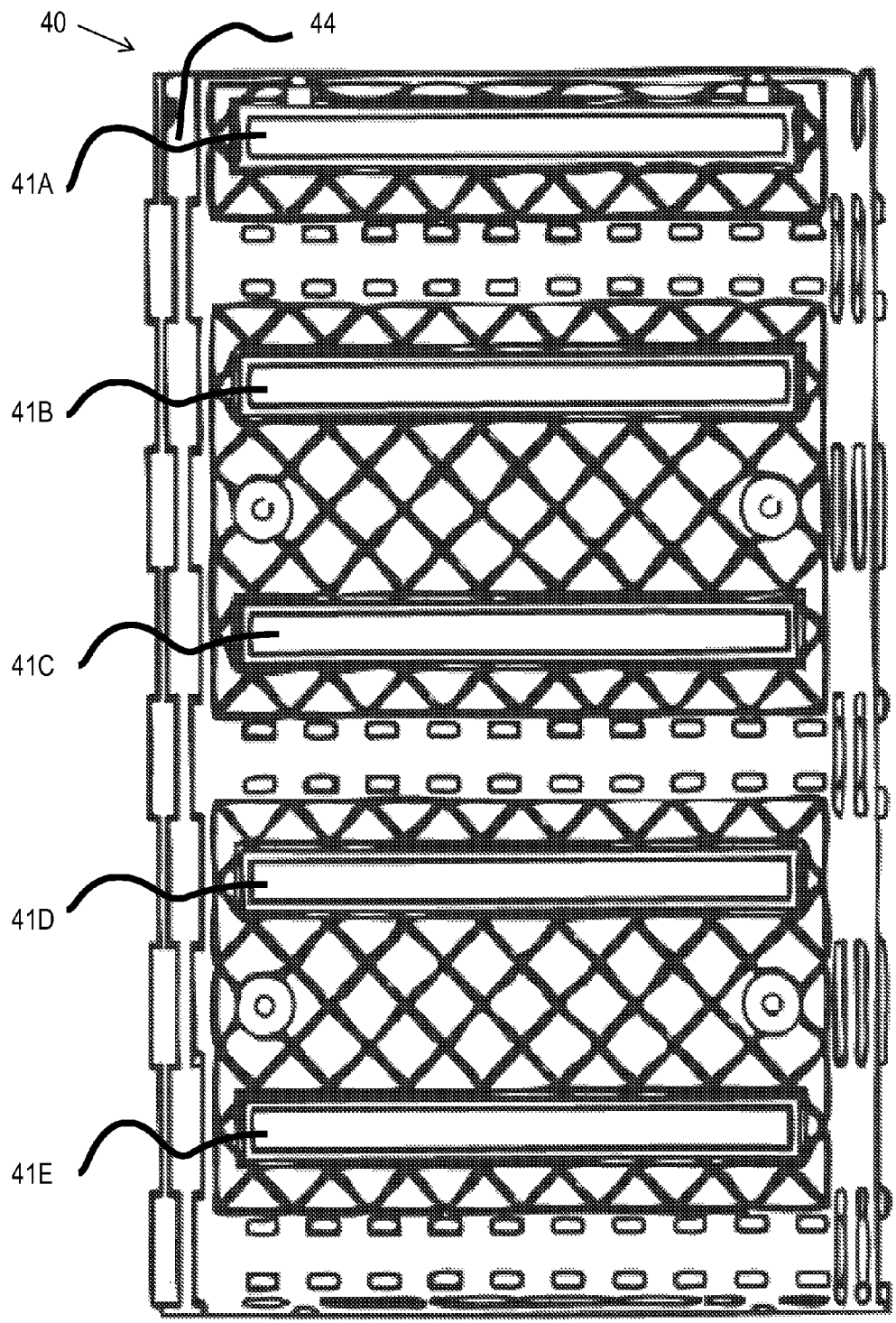
FIG. 9(b) schematically shows an embodiment of the mount board according to the present invention seen from the display facing side.

FIGS. 9(*a*) and (*b*) show an embodiment of the mount board according to the present invention. The mount board 40 is a generally rectangular plate having a face for facing the display and a face for facing the appliance.

FIG. 9(*a*) shows the mount board seen from the appliance facing side. FIG. 1(*b*) shows the same mount board seen from the display facing side.

The mount board 40 comprises a first connection element in the form of slots 41A-41E, three horizontally extending grooves 42A-42C and an appliance facing groove 43, visible in FIG. 9(*a*). A display facing groove 44 is visible in FIG. 9(*b*).

The mount board 40 has five slots 41A-41E elongated in the horizontal direction of the display. The slots 41A-41E are vertically positioned such that the distance between the neighboring slots matches the VESA-FDMI holes pattern. The mount board 40 may be attached to a flat panel display by means of screws penetrating through the slots into the VESA-FDMI holes in the back of the display. The mount board 40 may be positioned at a desired location on the back of the display by using desired slots and choosing desired horizontal positions in the slots. Due to the flexibility in the positioning of the mount board 40, the mount board 40 can be mounted to the back of a flat panel display having various types of configurations.

The mount board 40 has one side provided with a display facing groove 44 (visible in FIG. 9(*b*)) which faces the display and another side provided with an appliance facing groove 43 (visible in FIG. 9(*a*)) facing the opposite way.

The mount board 40 in this embodiment has three horizontally extending grooves 42A, 42B, 42C. The three horizontally extending grooves 42A, 42B, 42C are vertically neighboring to each other. Each of the grooves 42A, 42B, 42C has an open end merging into the appliance facing groove 43. Each of the grooves 42A, 42B, 42C has teeth for holding elements therein.

The mount board 40 comprises holes 45A above the first connection element 41A and holes 45B below the horizontally extending groove 42C. These holes may be used to connect the mount board 40 to other mount boards at its top and the bottom.

The mount board 40 comprises holes 46 at various locations. These holes may improve the ease of the manufacture of the mount boards.

Figure 10:
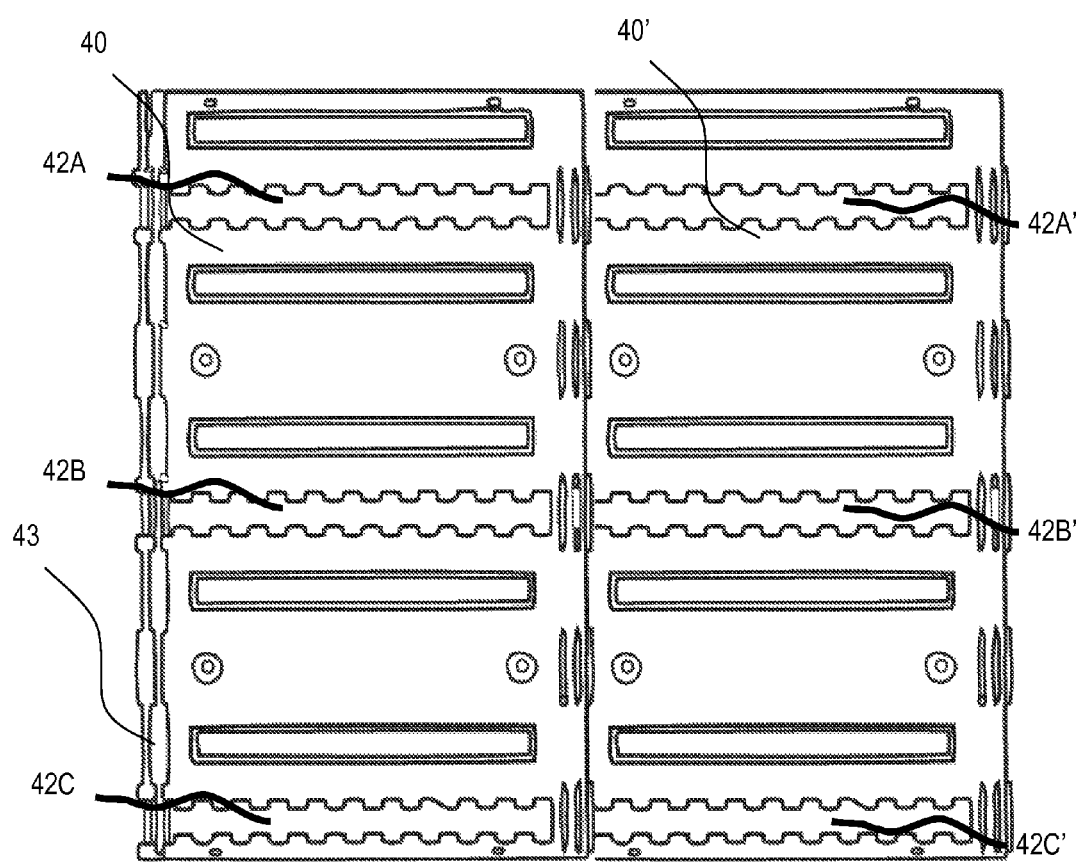

Referring to FIG. 10, two mount boards 40, 40' according to the invention are shown connected to each other by the display facing groove 44 of the mount board 40 and the appliance facing groove 43' of the mount board 40'. The display facing groove 44 of the mount board 40 and the appliance facing groove 43' of the mount board 40' have corresponding cross sections and are slidable into each other so that the mount boards 10 and 10' can be connected to each other side by side.

In FIG. 10, the open ends of the grooves 42A',42B',42C' of the mount board 40' are closed by the neighboring mount board 40. In this figure, the open ends of the grooves 42A, 42B,42C of the mount board 40 are open. A bar having a shape corresponding to the shape of the appliance facing groove 43 may be slid into the appliance facing groove 43. In this case, the open ends of the grooves 42A,42B,42C are closed by the bar to ensure that the support element 50 and the positioning element 60 are retained in the grooves 42A,42B, 42C.

Figure 11:
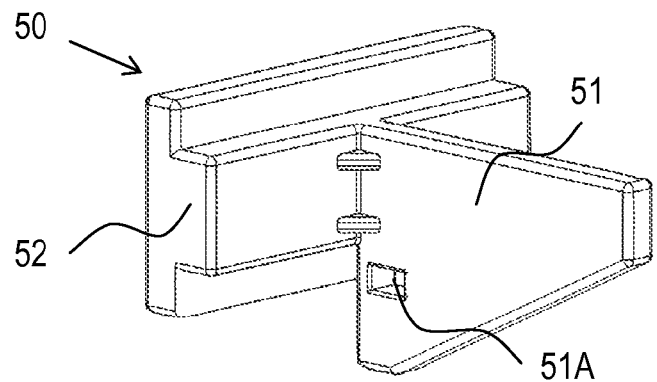

FIG. 11 shows a perspective view of one embodiment of the support element 50 according to the present invention. The support element 50 comprises a support portion 51 and a portion 52 insertable into the groove 42A,42B,42C through its open end to be retained therein. The portion 52 insertable into the groove has a shape and a dimension to fit the groove 42A,42B,42C to be retained by and in the grooves 42A, 42B, 42C. The support portion 51 has an open end for supporting an appliance thereon. In this embodiment, the support portion 51 is provided with a hole 51A. A band may be inserted therein to form a loop, which loop may be used for organizing cables of the display and/or the appliance mounted on the system.

Figure 12A:
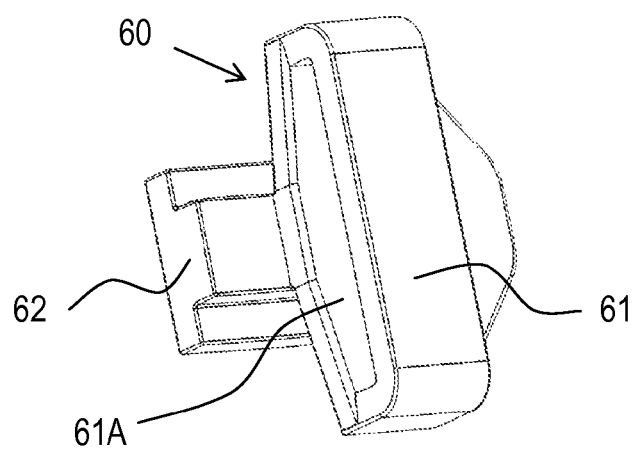
FIG. 12(a) schematically shows a perspective view of one embodiment of the adjustable fastening element according to the present invention.

FIG. 12(a) shows a perspective view of one embodiment of a positioning element 60 of the adjustable fastening element according to the present invention. The positioning element 60 comprises a portion 61 comprising a slot 61A facing in the horizontal direction. The band may be inserted in the slot 61A. The positioning element 60 is used in pairs in combination with a band. Two of the positioning elements 60 are inserted in the same horizontally extending groove 42A, 42B or 42C and the band is connected to the two positioning elements 60s in the same groove. The distance between the two positioning elements is adjustable. The positioning element 60 comprises a portion 62 insertable into the groove 42A,42B,42C through its open end to be retained therein. In this example, the insertable portion 62 of the positioning element 60 has the same shape as the insertable portion 52 of the support element 50.

Figure 12B:
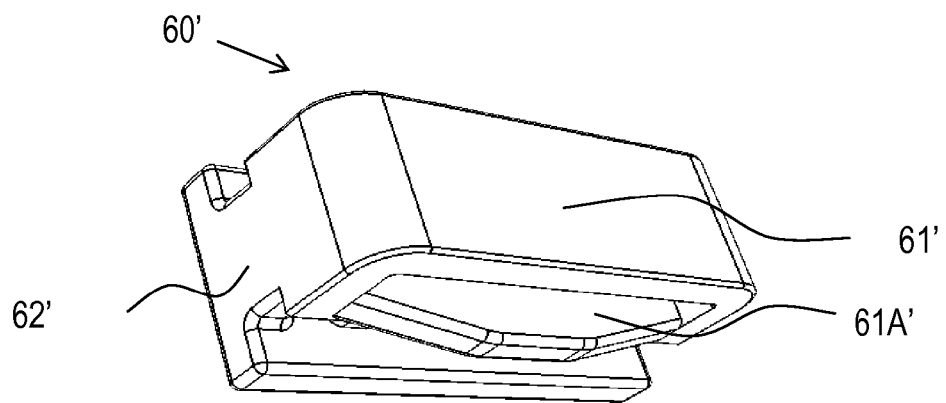
FIG. 12(b) schematically shows a perspective view of another embodiment of the adjustable fastening element according to the present invention.

FIG. 12(b) shows a perspective view of another embodiment of a positioning element 60' of the adjustable fastening element according to the present invention. The positioning element 60' is shaped in the same way as the positioning element 60, except that the positioning element 60' comprises a portion 61' comprising a slot 61A' facing in the vertical direction, instead of a slot 61A facing in the horizontal direction as in the positioning element 60. Two positioning elements 60' are suitable for use where each of the two positioning elements 60' is inserted in different grooves. The band connected to the positioning elements 60' runs vertically to hold the appliance.

Figure 13A:
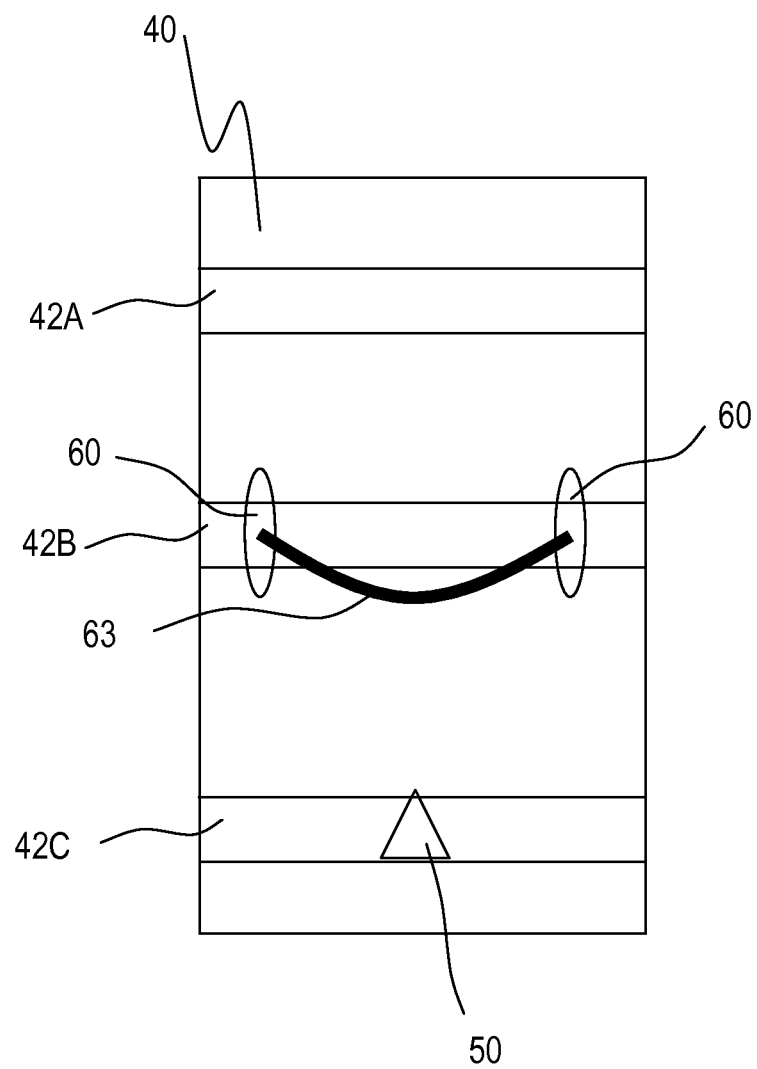
FIG. 13(a) schematically shows an embodiment of the system according to the present invention seen from the appliance facing side and FIG. 13(b) schematically shows a further embodiment of the system according to the present invention seen from the appliance facing side.

FIG. 13(a) shows a typical exemplary situation using the mount board 40 of FIG. 9. In this example, one support element 50 of FIG. 11 and two positioning elements 60 of FIG. 12(a) are mounted on the mount board 40. The support element 50 is inserted in the lowest groove 42C and two positioning elements 60 are inserted in the groove 42B. An appliance (not shown) rests on the support element 50 and is positioned between the two positioning elements 60. A band 63 is connected to the two positioning elements 60 in the groove 42B and holds the appliance in place.

Figure 13B:
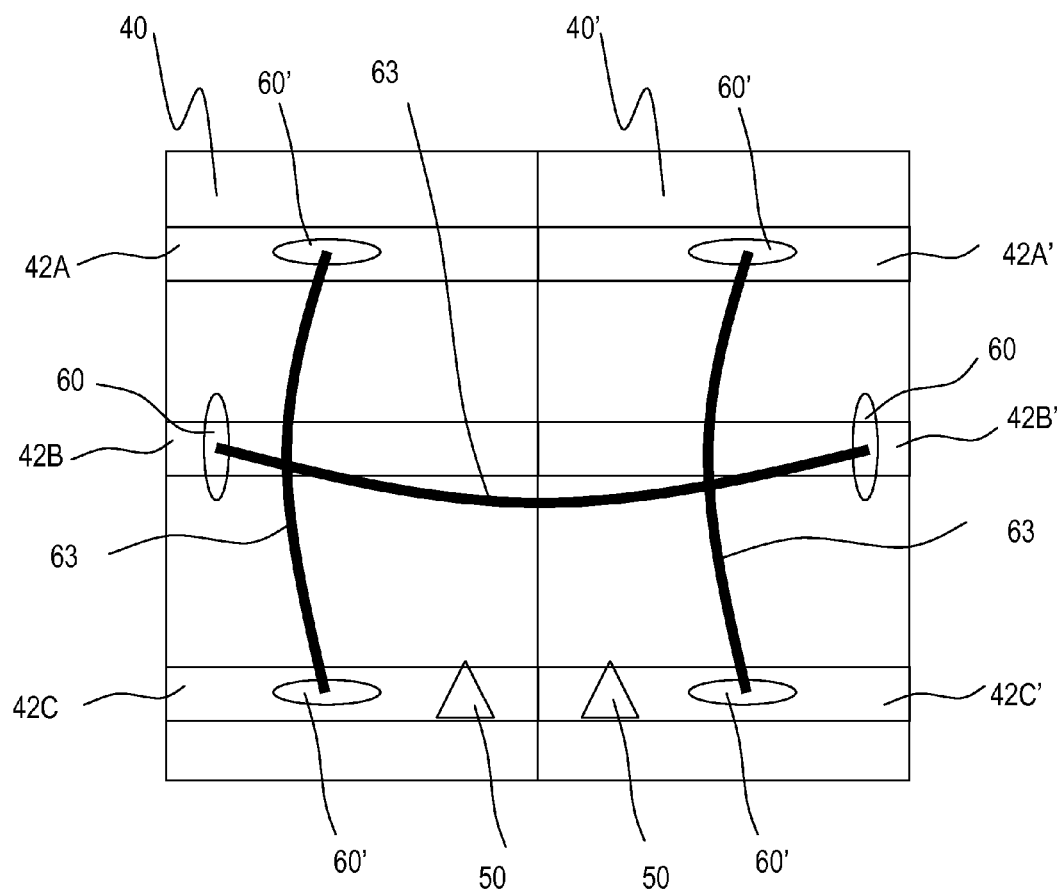

FIG. 13(b) shows another typical exemplary situation for a larger appliance. In this example, the two connected mount boards 40,40' of FIG. 10, two support elements 50 of FIG. 11, two positioning elements 60 of FIG. 12(a) and four positioning element 60' of FIG. 12(b) are used. In this situation, one support element 50 is inserted in the groove 42C of the mount board 40 and one support element 50 is inserted in the groove 42C' of the mount board 40'. One positioning element 60' is inserted in the groove 42C and one positioning element 60' is inserted in the groove 42A. A band 63 runs between these two positioning elements 60' in the vertical direction over the mount board 40. Similarly, the combination of one positioning element 60' in the groove 42A', one positioning element 60' in the groove 42C' and a band 63 is made. Further, one positioning element 60 is inserted in the groove 42B and one positioning element 60 is inserted in the groove 42B' and the band 63 runs horizontally over the mount boards 40 and 40' to hold the appliance.

The invention claimed is:

1. A system for mounting an appliance (18) behind a flat panel display (200) having VESA-FDMI holes (201, 202, 203, 204), comprising:
    a mount board (10) provided with a first connection element (11A, 11B, 11C, 11D, 11E, 11F) with which the mount board is connectable to the display via the VESA-FDMI holes, a second connection element (12A, 12B, 12C, 12D) and a third connection element (13A, 13B);
    a support element (20A, 20B) connectable to the mount board via the second connection element of the mount board and comprising a support portion (21A, 21B) having open ends for supporting the appliance thereon; and
    an adjustable fastening element (30) connectable to the mount board via the third connection element of the mount board for fastening the appliance against the mount board.

2. The system according to claim 1, wherein the first connection element of the mount board comprises at least one slot (11A-11F); having a horizontally elongated shape with its length larger than the distance between two horizontally neighboring VESA-FDMI holes.

3. The system according to claim 1, wherein the first connection element of the mount board comprises at least one slot (11A-11F) having a vertically elongated shape with its length larger than the distance between two vertically neighboring VESA-FDMI holes.

4. The system according to claim 1, wherein the first connection element of the mount board comprises at least two vertically neighboring slots (11A-11F) each having a horizontally elongated shape with its length larger than the distance between two horizontally neighboring VESA-FDMI holes.

5. The system according to claim 4, wherein the distance between the vertically neighboring slots matches the distance between two vertically neighboring VESA-FDMI holes.

6. The system according to claim 1, wherein the mount board comprises an indented area around the first connection element of the mount board, the indented area being indented towards the display when the mount board is attached to the display.

7. The system according to claim 1, wherein the second connection element comprises a horizontally elongated slot and the support element comprises a portion (22A, 22B) insertable into the slot of the second connection element to be retained between the display and the mount board when the mount board is attached to the display.

8. The system according to claim 7, wherein the support element further comprises a joint portion (23, 24) between the support portion and the insertable portion, the joint portion comprising a first joint portion (23) extending substantially perpendicular from the support portion and a second joint portion (24) extending substantially perpendicular from the insertable position.

9. The system according to claim 8, wherein the support element further comprises a protrusion (25) between the support portion and the first joint portion, protruding in the direction away from the second joint portion, wherein the mount board further comprises a support assisting member (14) provided below the second connection element, having a supporting face for supporting the support element and wherein the supporting face is provided with a slot (16) extending parallel to the slot of the second connection element, into which slot the protrusion of the support element is insertable.

10. The mount board as defined in the system according to claim 1.

11. The support element as defined in the system according to claim 7.

12. The system according to claim 1, wherein the third connection element comprises a first slot (13A) and a second slot (13B) and the fastening element comprises a band connection element comprising ends (30A, 30B) which are connectable to the first slot and the second slot.

13. The system according to claim 1, wherein the third connection element comprises a first slot (13A) and a second slot (13B) and the fastening element comprises a first band connectable to the first slot and a second band connectable to the second slot, and wherein the first band and the second bands have open ends which are connectable to each other.

14. The system according to claim 1, wherein the mount board is not visible from the front side of the flat panel display when the mount board is attached to the display.

15. The system according to claim 1, further comprising an infrared receiver.

16. A system for mounting an appliance behind a flat panel display having VESA-FDMI holes, comprising:
   a mount board (40) provided with a first connection element (41A-41E) with which the mount board is connectable to the display via the VESA-FDMI holes;
   a support element (50) connectable to the mount board and comprising a support portion (51) having open ends for supporting the appliance thereon; and
   an adjustable fastening element connectable to the mount board for fastening the appliance against the mount board,
   wherein the mount board (40) is connectable to a further mount board (40') of the same type.

17. The system according to claim 16, wherein the mount board has one side provided with a display facing groove (44) for facing the display during use and an appliance facing groove (43) facing the opposite way and the display facing groove and the appliance facing groove have corresponding shapes which allow sliding into each other.

18. The system according to claim 17, wherein the display facing groove and/or the appliance facing groove are provided with a locking means for fixing to each other.

19. The system according to claim 16, wherein the mount board is provided with a horizontally extending groove having at least one open end and the support element is insertable into the horizontally extending groove through the open end to be retained therein.

20. The system according to claim 16, wherein the adjustable fastening element comprises at least two positioning elements (60) connectable to the mount board and a band (63) connectable to the at least two positioning elements.

21. The system according to claim 20, wherein the mount board is provided with a first horizontally extending groove (42A) having at least one open end and the positioning elements are insertable into the first horizontally extending groove through the open end to be retained therein.

22. The system according to claim 21, wherein the mount board is further provided with a second horizontally extending groove (42B) having at least one open end and the positioning elements and/or the support element are insertable into the second horizontally extending groove through the open end to be retained therein, wherein the second horizontally extending groove is positioned at a lower vertical position than the first horizontally extending groove.

23. The system according to claim 22, wherein the mount board is further provided with a third horizontally extending groove (42C) having at least one open end and the positioning elements and/or the support element are insertable into the third horizontally extending groove through the open end to be retained therein, wherein the third horizontally extending groove is positioned at a lower vertical position than the second horizontally extending groove.

24. The adjustable fastening element as defined in the system according to claim 20.

25. The system according to claim 21, wherein the positioning elements comprise slots (61A) which face each other when inserted in the same groove (42A, 42B, 42C).

26. The system according to claim 16, wherein the first connection element of the mount board comprises at least one slot (41A-41E) having a horizontally elongated shape with its length larger than the distance between two horizontally neighboring VESA-FDMI holes.

27. The system according to claim 16, wherein the system comprises at least two mount boards (40,40').

28. The system according to claim 16, further comprising an infrared receiver.

29. The mount board as defined in the system according to claim 16.

30. The support element as defined in the system according to claim 16.

* * * * *